Sept. 11, 1956 W. H. F. MIEHE 2,762,620
DETINNING APPARATUS
Filed July 5, 1952 3 Sheets-Sheet 2
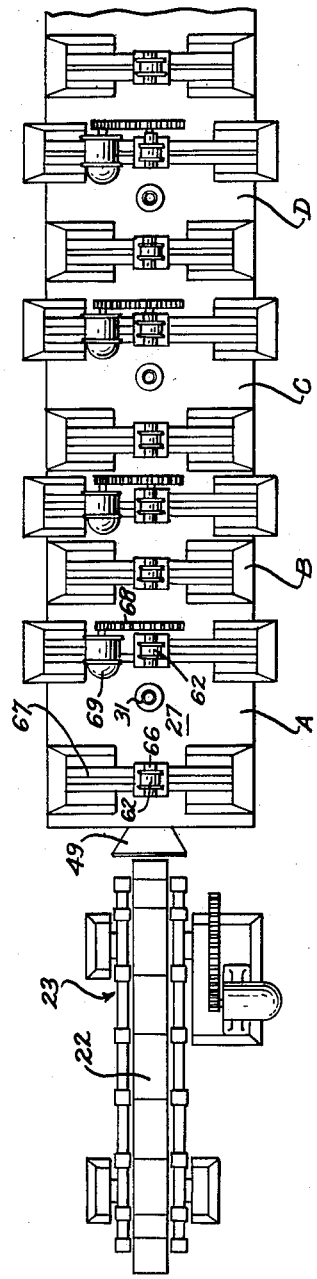
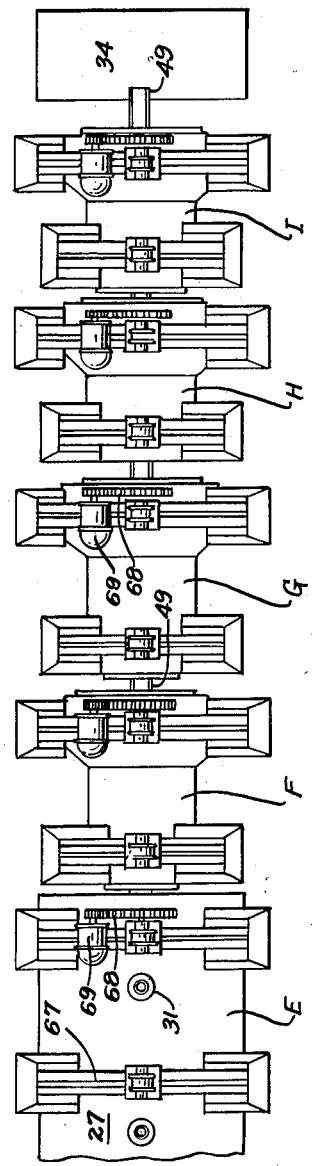
INVENTOR.
WILLIAM H. F. MIEHE
BY
Townsend and Townsend
ATTORNEYS Sept. 11, 1956
W. H. F. MIEHE
2,762,620
DETINNING APPARATUS
Filed July 5, 1952
3 Sheets-Sheet 3
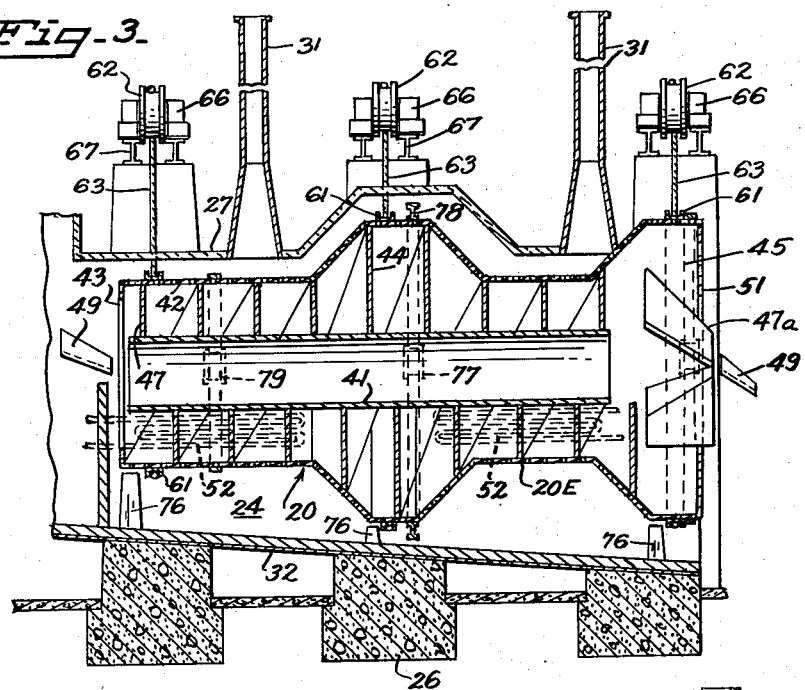
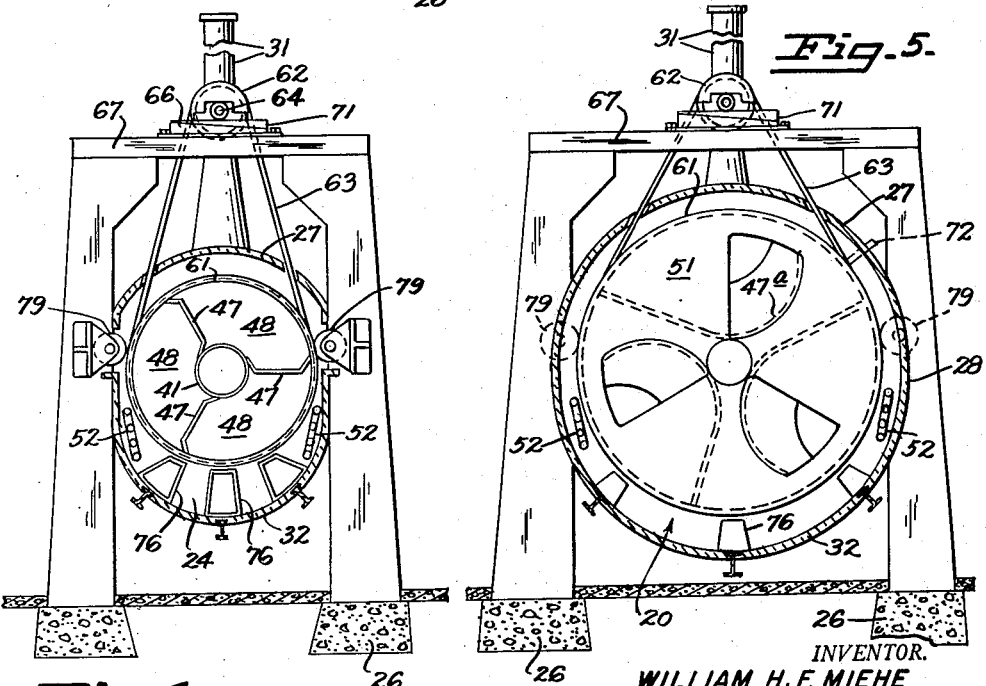
INVENTOR.
WILLIAM H. F. MIEHE
BY
Townsend and Townsend
ATTORNEYS United States Patent Office 2,762,620
Patented Sept. 11, 1956

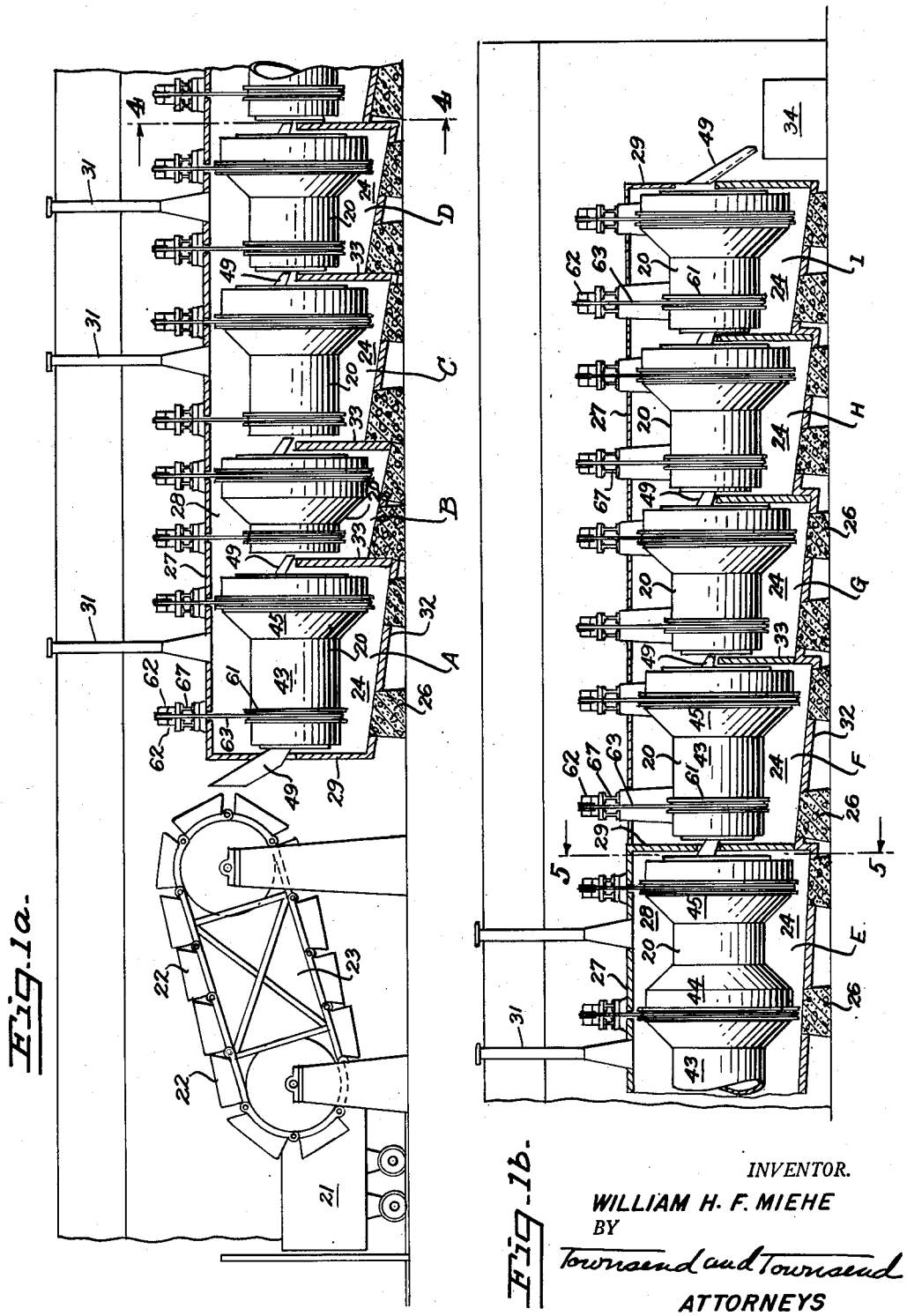

2,762,620

DETINNING APPARATUS

William H. F. Miehe, Redwood City, Calif., assignor to Metal & Thermit Corporation, New York, N. Y., a corporation of New Jersey Application July 5, 1952, Serial No. 297,256

16 Claims. (Cl. 266—1)

This invention relates to new and useful improvements in apparatus and method for removing tin from tinplate scrap and the like.

For many years it has been the practice to remove tin from scrap tinplate by various processes in order to recover the tin and also the steel scrap on which the tin is coated. One such method employs alkali and oxidizer and is widely used commercially. At the present time the conventional method of detinning scrap is to load the same into large perforate drums which are lowered into a series of vats containing various solutions. The scrap is subjected to treatment in each vat in the series and this involves first lowering the drum into the vat and then, after a sufficient time has elapsed for completion of the action, hoisting the drum and conveying the same to the next vat in order. Commercial plants employing the foregoing process are huge, expensive installations which handle large batches and require for efficient operation a very extensive source of scrap. Transportation of scrap to the detinning plant is an important factor in the cost of raw materials and many areas in which scrap is at present accumulated cannot dispose of scrap for detinning purposes because of geographic remoteness from the detinning plant and the fact that sufficient scrap is not accumulated in the area to justify the erection of a new plant.

The present invention involves the use of apparatus hereinafter described which is equipped to handle small batches of scrap tinplate in a substantially continuous process and which does not require the lifting of drums from one vat to another. Thus the present invention avoids the expensive, cumbersome equipment which is conventional in detinning plants, and, further, by reason of the smaller capacity of the instant apparatus, the plant may be located closer to the source of raw material, even though the quantity of scrap accumulated in the area in which it is located would not justify erection of a conventional plant.

The present invention involves the use of small batches of tinplate scrap of about the size of the billets used by steel mills in open hearth furnaces. These small batches are continuously and violently agitated, with the result that the detinning solution contacts all of the coated surfaces of the scrap and has an opportunity to remove all of the tin. The resultant steel scrap is substantially free of tin, which makes the scrap of greater value to a steel mill. Further, the recovery of tin is higher. The apparatus which is involved in the use of the present invention comprises a series of revolving perforate drums which are suspended and rotated in a tank so that the lower half of the drum which contains the scrap is at all times immersed in liquid. A plurality of helical flights or passageways is provided inside each perforate drum. The scrap tinplate is dumped periodically into one end of each flight and then scrap is carried forward upon revolution of the drum to the opposite end where it is drained of liquid and deposited in one end of a flight of the next drum in order. A series of such drums is provided, the contents of the tanks in which each drum is immersed varying. Thus, after the scrap has passed through each of the drums in the series, a complete detinning process has been accomplished, substantially all of the tin having been removed from the scrap.

It will be observed that in accordance with this invention it is unnecessary to lift the detinning drum from one tank to another, thereby allowing the tanks to be covered and sealed at all times during the detinning process and further permitting insulation against heat loss of the heated tanks. For inspection, sampling of scrap and solutions and the like, inspection windows are strategically placed. Substantial saving in steam and chemicals is effected by reducing the unavoidable contact of air and scrap with the equipment, as this heretofore has been a cause of fouling the solution, forming sodium carbonate.

In accordance with conventional practice, the draining of liquid from the detinning batches as the drums are moved from one tank to the next is a difficult problem. The apparatus hereinafter described employs a small drier placed between the pre-wash drum and the first detinning drum which reduces dilution of the detinning solution. Further, the discharge ends of the drums are constructed to trap and drain the solution and divert it back to the tank. Thus dilution and contamination are greatly reduced by the practice of the instant invention, resulting in a saving in the addition of chemicals and of steam presently required to concentrate diluted solutions.

Another feature of the present invention is an improved washing of the tin plate scrap which results in removing dirt from the white scrap. This dirt, if not removed, would form an objectionable residue commonly termed "black mud." The present apparatus removes a high percentage of the dirt and leaves only a small amount of residue with the result that the tin content of the residue is higher and the recovery of the tin is higher and less expensive.

Savings in labor is one of the important features of this invention. The labor required to operate the apparatus comprises one man to operate a small overhead crane to load scrap in small quantities onto a conveyor feeding the detinning plant, a foreman and an assistant to operate and lubricate the apparatus and perform the required periodic chemical analyses of the solutions and sampling of the white and black scrap.

The original investment is greatly reduced over that currently required in conventional processes. The original cost of the equipment is less. Further, the building structure to house the equipment requires only light foundations and inexpensive roofs and walls as compared with the present-day detinning installations. Further, because of the smaller crews required, considerable savings result in facilities such as locker rooms, wash rooms and the like for crews.

Other objects of the present invention will become apparent upon reading the following specification and referring to the accompanying drawings in which similar characters of reference represent corresponding parts in each of the several views.

Fig. 1, which is, by reason of space limitations, divided into two parts, namely, Figs. 1a and 1b, is a longitudinal vertical section through the apparatus illustrating the same in a more or less diagrammatic way.

Fig. 2, which, by reason of space limitations, is divided into two parts, namely, Figs. 2a and 2b, is a top plan.

Fig. 3 is a vertical section through one of the revolving drums hereinafter described.

Fig. 4 is an end elevation of the drum shown in Fig. 3 viewed from the inlet end.

Fig. 5 is an end elevation of said drum viewed from the discharge end.

The apparatus which is the subject of this invention comprises a series of slowly revolving perforate drums 20 which may be placed in a line end to end, or which may be arranged in the form of a U. Each drum, except one which functions as a drier, is suspended in a tank containing wash water or a chemical solution. White scrap, this term being used to denote unprocessed tinplate scrap and the like, is charged into the inlet end of the first drum and is then carried from drum to drum throughout the entire length of the series of drums with different steps of the detinning process being performed in each drum. During the course of the processing, the tin coating is dissolved, leaving uncoated steel scrap, hereinafter termed black scrap. The black scrap is discharged and may be employed by steel mills. A solution which contains the tin removed may be subjected to electrolysis for the recovery of tin values or may be precipitated and treated in various ways. Generally the white scrap is received at the plant in cars 21 from which a small crane loads it into the buckets 22 of a traveling conveyor 23 which feeds the intake end of the first drum 20. Each bucket 22 is loaded with a weight of white scrap corresponding to the weight of the compressed bundle of black scrap which is transmitted to the steel mill after processing.

The series of drums 20 adjacent the intake end of the plant is supported in a series of tanks 24, said tanks being set on suitable foundations 26. The structure has an overlying cover 27 and surrounding side walls 28 and end walls 29 which exclude air and insulate against heat loss. At intervals along the cover 27 stacks 31 are provided for escape of fumes. The tanks 24 may be formed by a continuous longitudinal curved bottom 32 separated by a series of transverse walls 33. The lengths of the tanks 24 and drums 20 suspended therein are varying, depending upon the time required for the completion of the step of the process carried out in any particular tank.

The last drum 20 in order discharges the detinned scrap to its final disposition, generally a compressed bundle suitable for use by the steel mills.

As has been stated, the drums 20 vary in length in order to permit varying lengths of processing time for completion of each step. However, each of the drums is substantially the same in construction and is driven and supported in substantially the same manner. Hence, it will be sufficient to describe the structure and drive of a single drum, as illustrated in Figs. 3 to 5, it being understood that the other drums are similarly constructed.

Each drum includes an inner, small diameter cylinder 41 concentric with the axis of rotation of the drum, an outer perforate casing 42, the intake end 43 of which is substantially cylindrical and which flares out to a considerably larger diameter. Scrap is carried along the bottom of the drum, and as the scrap passes from the narrow diameter to the outwardly flared zone, it shifts from a longitudinally aligned position to a radially aligned position or even completely turns over. The turning movement greatly improves the effectiveness of the detinning process because it results in agitation of the scrap and insures that all surfaces are exposed to the chemical actions which take place in the drum.

Between the inner cylinder 41 and the outer casing 42 are a plurality of helical separators 47 which serve the function of supporting the outer casing 42 with respect to the inner cylinder 41 and which further divide the annular zone between the inner cylinder and the outer casing into a corresponding number of separate passageways 48. Thus, scrap dumped in the flight between two of the radially extending separator members 47 is kept separate from contact with scrap deposited in the other flights. The separator members 47 travel the scrap from the intake end 43 to the flared portion 44 intermediate the two ends. When the scrap reaches flared portion 44 an agitation and realignment of position of the scrap occurs which enhances chemical action. It will be seen that the intermediate flared portion 44 does not occur in all drums but only in one or more. As illustrated herein, only the fifth drum 20E is flared intermediate the ends. It will be understood that more than a single intermediate flared portion may be employed. In all of the drums, a flared discharge terminus 45 occurs adjacent which the inner cylinder 41 terminates and the direction of the helix of each separator 47 is reversed so that at the discharge end the helices are opposite in their direction than at the intake end. The separators with the reversed direction of the helix are indicated as 47a. Thus, as the drum is rotated by means hereinafter described, when it is stopped at the position illustrated in Fig. 3, one of the separators 47a is in registry with a chute 49 on the intake end of the next succeeding drum. Scrap slides down the chute 49 and into a succeeding drum. By reason of the downward helical passageway formed between the separator members, the scrap falls toward the bottom of the casing and by reason of the attraction of gravity tends to remain toward the bottom of the casing and to be carried along toward the discharge end as the casing revolves. During this passage through the drum, the scrap is kept separated from scrap deposited in the other passageways 48 and thus there is no tangling or mingling of the scrap.

By reason of the perforate structure of the outer casing 42, the scrap is subjected to the action of the liquid in the tank in which the drum is immersed throughout the entire time of passage through the intake end of the drum. When the scrap reaches the discharge end 45, where the direction of the helices of the separators is reversed, the separators raise the scrap up out of the tank to the top of the drum and when so lifted above the surface of the liquid in the tank the scrap drains and the liquid falls back into the tank. This economizes on liquid and prevents contamination of the next tank in order. After the drum has revolved to the position in Fig. 5 and separator 47a has assumed the position indicated, the scrap falls out of the discharge end of the separator and onto chute 49 which connects with the ramp at the intake end of the next drum in order. Ends 51 retain the scrap axially.

The tanks in which the drums are immersed may be heated by means of steam coils 52 and provision is made for pumping fresh liquid into the tanks and removing spent liquid for processing, reconcentration, filtering and the like. It will be seen, however, that heat losses are minimized by reason of the insulated cover 27 over the tanks and by reason of the fact that it is never necessary to remove any cover in order to hoist a drum out of the tank as is required in conventional processes. Further, it will be observed that the carry-over of liquid from one drum to the next is minimized by reason of the peculiar path of the scrap which provides a drainage area at the discharge end 45 of each drum which allows liquid to drain back into the tank from which it originally was carried.

The rotating drums 20 are driven and suspended by novel means. About the circumference of each end of each drum is a plurality of channels 61. Above the liquid level and preferably above the cover 27 is a corresponding plurality of pulleys 62. A plurality of continuous belts or cables 63 pass over each pulley 62 and under each channel 61 and this supports the weight of the drum 20. Pulleys 62 are mounted on longitudinally extending shafts 64 which are journalled in pillow blocks 66 on beams 67 above the cover 27 where they are out of contact with liquid or fumes thereby allowing good lubrication and increasing the life of the bearings. One of the pulleys 62 of each drum is power driven through a gear drive 68 from an electric motor 69. The speed of rotation of the drums 20 varies with the function of each apparatus in the process. Wedges 71 under pillow blocks 66 may be employed to facilitate adjustment and alignment.

Synchronous drives of each drum 20 may be employed but a preferable method is to stop each drum when it reaches loading position until scrap from the preceding step has been deposited therein. Thus, a switch actuating arm 72 (Fig. 5) may be mounted on each drum with the result that each drum stops each time one of the separators 47 reaches the loading position indicated by numeral 47a in Fig. 4 and remains stopped until a switch arm 72 on the preceding drum contacts a switch (not shown) to start the drive motor again, said last-mentioned switch arm operating when one of the flights of the preceding drum has reached discharge position indicated by numeral 47a in Fig. 5 and when sufficient time has elapsed to discharge the scrap into the next drum.

To support the drums 20 in event of breakage of a cable, a plurality of safety stops 76 (Figs. 3–5) is mounted on the bottom of the tank in close proximity to the bottom of the casing 42. Said stops 76 normally do not engage the casing, but if the drum starts to fall the casing immediately rests upon said safety stops and damage is prevented.

The axial thrust of the drums is supported by a plurality of grooved rollers 77 (Fig. 3) engaging rails 78 around the drums. In order to resist the lifting action of the belts 63 and to maintain the drum in position against longitudinal displacement, a plurality of rollers 79 is mounted on each side of each end of the drum.

The steps in the processing of scrap tinplate are subject to wide variation in that there are different chemical processes to perform this operation. The solutions in each tank will differ for different processes. For purpose of illustration, one such series of solutions will be described, it being understood that the invention is not intended to be limited to this particular process:

In the first tank A in order, a prewash with hot water is performed which removes most of the dirt and grease from the white scrap, the water being continuously changed and the dirty water discarded. The second tank B in order, which is of a shorter length, contains no liquid but operates as a drying tank to remove water from the scrap and to prevent carrying over of water from the prewash to the next tank in order. It will be understood that several prewashing tanks A and drying tanks B may be employed to insure removal of all dirt. It will further be understood that where hereinafter a single tank is shown to perform a single step, several tanks may be used in series and further that where several tanks are shown a larger number of tanks may be employed for the same purpose.

The third, fourth and fifth tanks, C, D and E, in order, subject the scrap to reaction with caustic and oxidizing solutions which remove the tin coating from the white scrap. The particular chemicals and the steps taken to purify, replenish and concentrate the various solutions employed in each of the three tanks C, D and E form no part of this invention and are not described in detail.

For facility of explanation, the steps occurring in tanks C, D, and E, will be described in reverse order. In tank E a solution of alkali and nitrite is maintained, the nitrite being an oxidizing agent which accelerates the detinning. As the solution becomes spent it is pumped into tank D where the remaining nitrite is reduced by action on the scrap in said tank D, it being essential that all of the nitrite be reduced. The solution of tank D is then pumped to tank C where all other oxidizing agents are reduced. The solution of tank C is pumped to a station (not shown) where the tin values are recovered, as by electrolysis. In order for the electrolysis or other recovery step to be effective it is essential that the oxidizing agents be inactivated. The reverse flow of solutions and scrap insures the inactivation of the oxidizing agents.

From tank E the scrap passes into the first of several wash tanks F, G and H. Here again the flow of wash water and scrap is in opposite directions. Clear water is pumped into the last tank H and then forwardly from tank to tank. The counterflow insures thorough washing of the scrap so that all the solutions are removed leaving clean scrap. The water in tank F is used to make up solutions for tanks C, D or E, thereby insuring that the tin values washed off the scrap are ultimately recovered.

From the foregoing description it will be seen that the instant invention has, among others, the following differences and advantages over conventional detinning practice:

1. The process is continuous rather than intermittent.
2. The detinning is simplified and the handling of large drums is eliminated.
3. Better detinning is accomplished by violent agitation of the scrap in small batches.
4. Saving in chemicals by reduction in carry-over of solutions from one tank to the next and by reduction in contact with air.
5. Saving in steam required to concentrate diluted solutions.
6. Reduction in formation of black mud.
7. Great saving in labor.
8. Considerable saving an initial investment in plant and equipment.
9. Economic operation of smaller plants.
10. Expansion of detinning operations into territories where present facilities are not feasible.

Although the present invention has been described in some detail by way of illustration and example for purposes of clarity of understanding, it is understood that certain changes and modifications may be made within the spirit of the invention and scope of the appended claims.

What is claimed is:

1. Apparatus for the solution detinning of tin scrap comprising a rotatable perforate outer drum, a central cylinder inside said drum, helical means interposed between said drum and said cylinder, said means dividing the annular zone between said drum and said cylinder into a plurality of flights, each accommodating a quantity of scrap, said helical means being arranged to advance said scrap from the intake end of said drum to the discharge end thereof, the direction of the helix of said means being reversed adjacent the discharge end of said drum to elevate said scrap above the bottom of said drum prior to discharge, a tank for liquid in which said drum is partially submerged, means for rotatably suspending the drum in said tank comprising a pulley, means for supporting said pulley above said drum, and a cable passing over said pulley and under said drum and partially supporting the weight of said drum, means for revolving said pulley to revolve said drum.

2. A detinning plant comprising a plurality of apparatuses constructed in accordance with claim 1 arranged end to end, the discharge of one drum being arranged to slide into the intake end of the next drum in order, and means on said one drum to energize the means for revolving the pulley of said next drum when the discharge of said one drum is completed.

3. Apparatus for detinning tinned scrap comprising a plurality of drums through which the scrap passes, each drum being perforated and rotatable, said drums being arranged end to end and each having an enlarged exit end to facilitate turning of the scrap at said exit end, each drum being disposed in a tank having a floor which slopes downwardly from the inlet end to the exit end thereof to accommodate the enlarged exit end of the drum, means for suspendably supporting each drum at end portions thereof, and means for moving said supporting means and thereby rotating each drum.

4. Apparatus for detinning tinned scrap comprising a plurality of drums through which the scrap passes, each drum being perforated and rotatable, said drums being arranged end to end and each having an enlarged exit end to facilitate turning of the scrap at said exit end, each drum being disposed in a tank having a floor which slopes downwardly from the inlet end to the exit end thereof to accommodate the enlarged exit end of the drum, each said tank having a cover, means for suspendably supporting each drum at end portions thereof, and means for passing scrap from the exit end of one drum to the inlet end of the next succeeding drum.

5. Apparatus for detinning tin scrap comprising a rotatable perforate outer drum, helical means within said drum arranged to advance said scrap from one end of said drum to the other, a helical portion of substantially the same diameter as said helical means disposed adjacent the discharge end of said drum, said helical portion having a helix direction reversed relatively to that of said helical means and acting to elevate said scrap above the bottom of said drum prior to discharge, said drum having an enlarged discharge end portion to facilitate realignment of the scrap by said helical portion and to facilitate removal of the scrap, and means for rotating said drum.

6. Apparatus for detinning scrap comprising a rotatable perforate outer drum, a central cylinder inside said drum, a plurality of helical separators interposed between said drum and said cylinder, said separators dividing the annular zone between said drum and said cylinder into a plurality of flights, each flight accommodating a quantity of scrap separate from that in the other flights, said separators being arranged to advance said scrap from the intake end of said drum to the discharge end thereof, a helical portion adjacent the discharge end of said drum having a helix direction reversed relatively to that of said separators and acting to elevate said scrap above the bottom of said drum prior to discharge, said drum having an enlarged discharge end portion to facilitate realignment of the scrap by said helical portion, and means for rotating said drum.

7. The apparatus of claim 6 in which said drum has apertured ends with the number of apertures corresponding with the number of said flights.

8. The apparatus of claim 6 in which said drum has an enlarged intermediate portion to aid in realigning the scrap during passage of the same through the drum.

9. The apparatus of claim 1 having means mounted exteriorly of said drum for restraining the latter against displacement in an axial direction.

10. The apparatus of claim 9 in which said restraining means comprises a rail member on the drum interengageable with a grooved roller on the tank.

11. The apparatus of claim 1 having means mounted exteriorly of the drum for restraining the latter against vertical displacement.

12. The apparatus of claim 11 in which said restraining means comprises at least one pair of oppositely disposed rollers each adapted to engage the drum at a point on the upper half of the drum.

13. In apparatus for detinning tin scrap by means of a detinning solution, the improvement comprising a perforate outer drum having an inlet end and an enlarged exit end portion, a centrally disposed cylinder in said drum terminating at said enlarged exit end portion, a plurality of helical members interposed between said drum and cylinder and forming a plurality of helically shaped passageways, each passageway accommodating a quantity of scrap, said helical members acting to advance said scrap through the drum from said inlet end to said exit end portion, a helical portion in said enlarged exit end portion of the drum having a helix direction reversed relatively to that of said helical members, said helical portion being axially alined with said helical members and serving to receive scrap therefrom and to turn and realign the same in said enlarged exit end portion prior to discharge of the scrap from the drum.

14. Apparatus according to claim 13 in which said drum is disposed in a tank adapted to hold liquid, means for rotatably suspending the drum in said tank so that the drum is partially submerged in said liquid, said suspending means comprising a plurality of spaced pulleys mounted above said drum, means for supporting said pulleys, a cable passing over each pulley and under the drum, and means for rotating the pulleys.

15. Apparatus according to claim 14 in which a plurality of stop members are disposed in the lower portion of the tank and are slightly spaced from said drum, said stop members serving to support the drum when said suspending means are inoperative to hold the drum.

16. A plant for detinning tinned scrap by means of a detinning liquid comprising a plurality of drums through which the scrap passes, each drum being perforated and rotatable, said drums being arranged end to end and each having an enlarged exit end to facilitate turning of the scrap at said exit end, each drum being disposed in a tank having a floor which slopes downwardly from the inlet end to the exit end thereof to accommodate the enlarged exit end of the drum, means disposed over each drum for suspendably supporting the same at end portions thereof and for coincidently rotating said drum, said tank being adapted to hold liquid in which said drum is partially submerged, drive means for rendering said supporting and rotating means operative to rotate each said drum independently of other drums, each said tank having a cover which aids in preventing loss of heat and liquid from said tank and in protecting said liquid and said drive means against contamination and corrosion, and means for passing scrap from the exit end of one drum to the inlet end of the next succeeding drum.

References Cited in the file of this patent
UNITED STATES PATENTS

| | | |
|---|---|---|
| Re. 20,530 | Walker | Oct. 12, 1937 |
| 344,388 | Levy | June 29, 1886 |
| 596,533 | Naeb | Jan. 4, 1898 |
| 690,005 | Anderson et al. | Dec. 31, 1901 |
| 730,086 | Bohrman | June 2, 1903 |
| 883,211 | Leitch | Mar. 31, 1908 |
| 1,077,036 | Bradley | Oct. 28, 1913 |
| 1,858,669 | Hinchley | May 17, 1932 |
| 2,451,053 | Anderson et al. | Oct. 12, 1948 |
| 2,545,239 | McQuiston et al. | Mar. 13, 1951 |
| 2,585,294 | Ashton | Feb. 12, 1952 |

FOREIGN PATENTS

| | | |
|---|---|---|
| 16,150 | Great Britain | 1914 |
| 683,900 | France | Mar. 10, 1930 |
| 383,756 | Great Britain | Nov. 24, 1932 |
| 945,690 | France | Nov. 29, 1948 |